3,016,375
PROCESS OF PRODUCING EPSILON-CAPROLACTAM

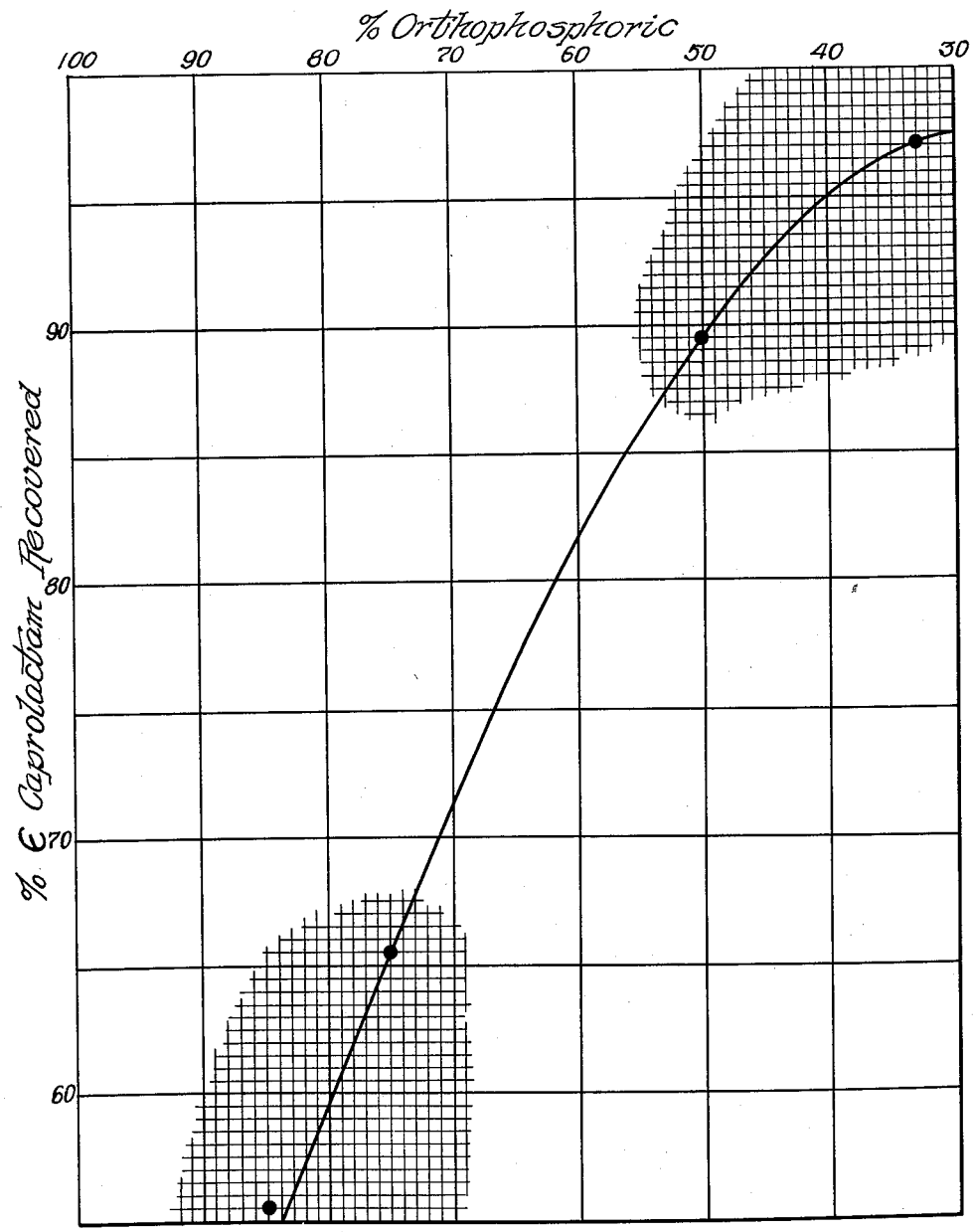

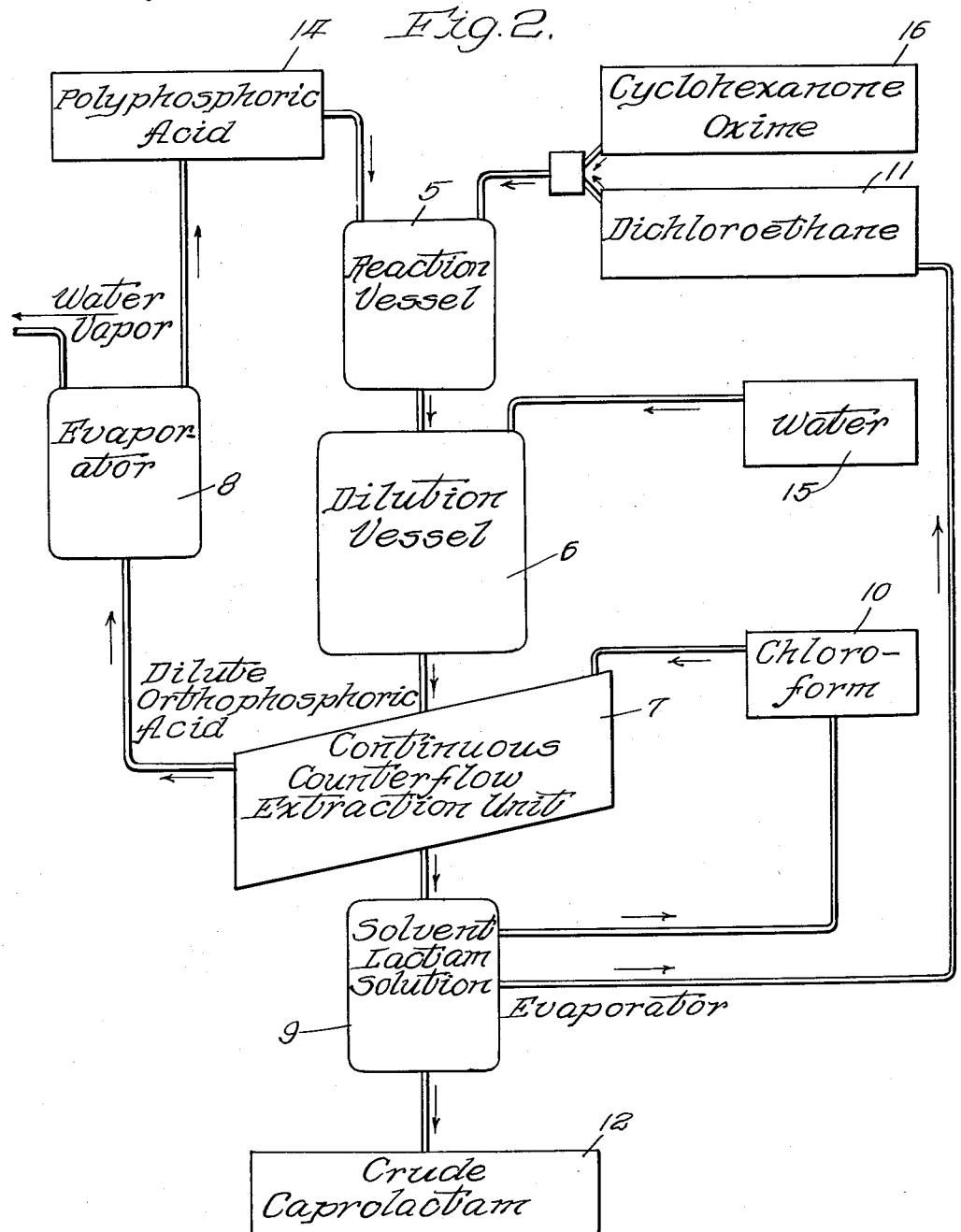

Thomas R. Hopkins, Johnson County, and James W. Steele, Overland Park, Kans., assignors to Spencer Chemical Company, Kansas City, Mo., a corporation of Missouri
Filed May 6, 1959, Ser. No. 811,383
9 Claims. (Cl. 260—239.3)

This invention relates to the production of epsilon-caprolactam. More particularly, this invention is concerned with novel procedures for rearranging cyclohexanone oxime to epsilon-caprolactam.

According to the present invention it has been discovered that cyclohexanone oxime can be rearranged with polyphosphoric acid to epsilon-caprolactam, and the reaction mixture extracted with an inert organic solvent to separate epsilon-caprolactam without prior neutralization.

A polyphosphoric acid which may be used in the rearrangement is commercially available and has an approximate composition of 82% to 84% $P_2O_5$ as the following acids:

|  | Percent |
|---|---|
| Triphosphoric acid | 55 |
| Pyrophosphoric acid | 21 |
| Orthophosphoric acid | 9 |
| Metaphosphoric acid | 5 |
| Unidentified acid | 10 |

The rearrangement is advisably effected by reacting a ratio of at least 0.75, and advisably not less than 1.0, parts by weight of polyphosphoric acid having a composition equivalent to at least about 75% $P_2O_5$, with 1 part by weight of cyclohexanone oxime. Although higher ratios of polyphosphoric acid can be employed, there is generally no increase in yields above a ratio of 3:1 parts by weight of acid to oxime. In addition, the increase from 1 part acid to 3 parts acid increases the yield of epsilon-caprolactam only from about 90% to 95%. Also, the percent conversion to epsilon-caprolactam increases as the acid strength (% $P_2O_5$) increases.

The rearrangement is readily effected by heating a mixture of cyclohexanone oxime and polyphosphoric acid at an elevated temperature such as from about 80° C. to 125° C. The reaction temperature range of about 80° C. to 110° C. is preferred. The time of reaction is not narrowly critical but, in general, about 0.25 to 2 hours is adequate for substantially complete reaction.

Following termination of the rearrangement, it has been found that the epsilon-caprolactam so formed can be separated, without neutralizing the reaction mixture, by extraction with a suitable inert organic solvent. Some of the solvents which may be employed for the extraction are xylene, n-decane, tetrachloroethane, 1,2-dichloroethane, chloroform, toluene, n-heptane and nitromethane. The preferred solvents for direct extraction of the rearrangement reaction mixture are those with boiling points above 100° C., and advisably above 125° C., and to 175° C. such as xylene, n-decane and tetrachloroethane. With such high boiling solvents the extraction can be effected by refluxing the mixture. With other solvents, mechanical mixing to promote dispersion of the solvent and thus improve extraction is conveniently employed. The epsilon-caprolactam is readily isolated from the extracting solvent such as by evaporation or distillation of the solvent. The epsilon-caprolactam so isolated may be purified, if desired, by crystallization from suitable solvents such as ligroin or n-hexane.

In another embodiment of the invention it has been found that the extraction process can be improved, and higher yields of epsilon-caprolactam recovered, by diluting the reaction mixture with water and then extracting the epsilon-caprolactam without neutralization of the diluted rearrangement mixture. The efficiency of the extraction increases, as does the yield of epsilon-caprolactam isolated, with increased dilution. In general, the reaction mixture can be diluted to any extent considered desirable wtih due regard being given to the total volume of material that must be handled and the subsequent recovery of the phosphoric acid or by-product use to which it may be put.

FIG. 1 of the accompanying drawing contains a graph illustrating the incerased recovery of epsilon-caprolactam by extraction as the dilution increases. Although the graph is specific to the use of chloroform as the extracting solvent, comparable results are obtained with other solvents such as those named above. While the graph gives the acid in percent of orthophosphoric acid present, these figures can be readily converted to equivalent percents of $P_2O_5$ according to the equation:

$$P_2O_5 + 3H_2O \longrightarrow 2H_3PO_4$$
142 mol. wt.          2×98 mol. wt.

Thus, it will be seen that for effective recoveries of at least about 50% of the epsilon-caprolactam, the polyphosphoric acid (generally about 82%–84% as $P_2O_5$) should be diluted to about 60%–65% as $P_2O_5$ or to 80%–90% orthophosphoric acid. For optimum extraction yields at least a 50% dilution of the orthophosphoric acid content in the rearrangement reaction mixture is effective.

When the rearrangement mixture is diluted with water as described, lower boiling solvents can be used for the extraction than in the case where no dilution is employed.

It has been found, also, according to another aspect of this invention, that the rearrangement process is more readily effected if a dispersant is included in the mixture to lower the viscosity of the polyphosphoric acid and thus facilitate intermixing and rearrangement of the oxime. Although it is not essential, it is certainly advisable for the dispersant to be an organic solvent in which the oxime at least, and the epsilon-caprolactam as well, are soluble. Organic solvents such as those named previously may be suitably employed as dispersants provided they have boiling points sufficiently high to avoid evaporation at temperatures adequate to effect the rearrangement. However, dispersants which boil within the range of the rearrangement temperature are particularly useful since they allow very close temperature control of the rearrangement mixture. Furthermore, this advantage is achieved at optimum rearrangement temperatures by using a dispersant with a boiling point of about 80°–110° C. Particularly useful dispersants are 1,2-dichloroethane, benzene, nitromethane, cyclohexane and n-heptane. In the case where it is desired to dilute the reaction mixture to isolate the epsilon-caprolactam by extraction with the same solvent used as the dispersant, a dispersant should be selected which is essentially immiscible with water.

When a low boiling dispersant (i.e., 80°–110° C.) is employed and the rearrangement mixture is not subsequently diluted with water, it is generally advisable to remove the low boiling solvent and effect the extraction of the epsilon-caprolactam with an organic liquid with a boiling point above 125° C.

One noteworthy advantage of extracting epsilon-caprolactam from the rearrangement reaction mixture without neutralization lies in the fact that the polyphosphoric acid can be recycled for use in the rearrangement of additional quantities of oxime. Even when the reaction mixture is diluted to facilitate extraction, the phosphoric acid can be concentrated by evaporation to polyphosphoric acid and used again for effecting the rearrangement. Alternatively, $P_2O_5$ can be added to the dilute orthophosphoric acid in sufficient amount to form polyphosphoric acid.

There is shown in FIG. 2 a flow diagram for a continuous process of extracting epsilon-caprolactam from the rearrangement reaction mixture formed by heating polyphosphoric acid containing cyclohexanone oxime. As shown in FIG. 2, cyclohexanone oxime from vessel 16 and dichloroethane from vessel 17 are combined and the resulting solution then fed into a reaction vessel 5 concomitantly with polyphosphoric acid. After the rearrangement has been effected the reaction mixture is fed to dilution vessel 6 into which water is fed from vessel 15. The diluted reaction mixture is then fed from the dilution vessel into a continuous extraction apparatus 7 into which chloroform is fed. The dilute orthophosphoric acid, substantially free of epsilon-caprolactam, is fed from the extraction apparatus into an evaporator 8 where water vapor is removed to reform polyphosphoric acid which is then fed into vessel 14 and from there into the reaction vessel. The epsilon-caprolactam solution in chloroform and dichloroethane is fed from the extractor into evaporator 9 where the chloroform is removed and fed to chloroform reservoir 10 for recycling; the dichloroethane evaporates next and is fed into the reservoir 11. Crude epsilon-caprolactam is recovered and sent to reservoir 12 for subsequent purification.

The following examples are presented to illustrate the invention.

EXAMPLE 1

A Beckmann rearrangement of cyclohexanone oxime was carried out by adding a solution of 35 g. of the oxime in 150 ml. of n-decane to 35 g. of polyphosphoric acid while stirring and heating at 85° C. The resulting mixture was stirred at this temperature for an additional 30 minutes. Three successive extractions were then carried out with 200 ml. portions of n-decane by heating at 140°–150° C. for 30 minutes and a fourth extraction was carried out at 150°–170° C. The solvent from each extraction was removed by distillation under reduced pressure, thereby isolating the crude epsilon-caprolactam, which was recrystallized from ligroin, M.P. 68°–71° C.

EXAMPLE 2

The rearrangement mixture from Example 1 was extracted with tetrachloroethane eight times with 200 ml. aliquots and at 146° C. The crude epsilon-caprolactam from the extracts was recrystallized from ligroin, M.P. 69°–74° C.

EXAMPLE 3

A solution of 20.0 g. of cyclohexanone oxime in 30 ml. of xylene was added dropwise to 20 g. of polyphosphoric acid while stirring and heating at 85° C. The heating was continued for 30 minutes after addition of oxime was completed. An additional 200 ml. of xylene was added, and the mixture was heated at reflux (pot temperature of 154° C.) while stirring was continued. After 30 minutes at reflux the stirring was discontinued and the upper xylene layer was siphoned from the flask. The xylene solution was distilled under reduced pressure, leaving a residue of crude caprolactam. The extraction was repeated a number of times by refilling the reaction flask with xylene to a constant volume and heating at reflux for 30 minutes. Successive weights of crude epsilon-caprolactam were isolated from the extracts and a total of 9.7 g. of crude epsilon-caprolactam obtained which was a 48.5% yield based on the cyclohexanone oxime charged.

The residual polyphosphoric acid was suitable for recycle for rearrangement of additional oxime.

EXAMPLE 4

Homogeneous mixtures, each containing 20 g. of epsilon-caprolactam and 20 g. of polyphosphoric acid were diluted with 5.0, 10.6, 25.8 and 50 ml. of water, resulting in solutions with $P_2O_5$ contents equivalent to 85, 75, 50 and 33% orthophosphoric acid respectively. Extractions of the diluted mixtures were then conducted in separatory funnels using 100 ml. increments of chloroform per extraction. The extracts were combined into 500 ml. batches and distilled under reduced pressure to leave a residue of epsilon-caprolactam. The results are recorded in the following Table 1; these results were used in the graph of FIG. 1.

*Table 1*

| Run | $H_3PO_4$ Equivalent percent | Yield of Epsilon-Caprolactam Per 500 ml. Extraction | | | | | | | |
|---|---|---|---|---|---|---|---|---|---|
| | | 1st Batch | | 2nd Batch | | 3rd Batch | | Total | |
| | | Wt. (g) | percent | Wt. (g) | percent | Wt. (g) | percent | Wt. (g) | percent |
| 1 | 85 | 9.4 | 47.0 | 1.3 | 6.5 | 0.4 | 2.0 | 11.1 | 55.5 |
| 2 | 75 | 10.3 | 51.5 | 1.7 | 8.5 | 1.1 | 5.5 | 13.1 | 65.5 |
| 3 | 50 | 15.7 | 78.5 | 1.8 | 9.0 | 0.4 | 2.0 | 17.9 | 89.5 |
| 4 | 33 | 19.6 | 97.0 | | | | | 19.6 | 97.0 |

EXAMPLE 5

One hundred grams of cyclohexanone oxime dissolved in 120 ml. of hot 1,2-dichloroethane was added over a period of 1.7 hours to 300 g. of stirred polyphosphoric acid (82%–84% $P_2O_5$). The acid had been preheated to 85° C. and the addition rate was adjusted to maintain a temperature range of 78°–92° C. The reaction mixture was stirred and held at 82° C. for 30 minutes after the addition was completed. Upon cooling, 560 ml. of water was slowly added to the mixture to adjust the solution to about 40% orthophosphoric acid. The diluted acid was extracted at room temperature with chloroform in 250 ml. increments. The extracts were combined into batches and distilled to dryness. Both the 40% acid and the chloroform extracts were colorless and water clear. The first batch, composed of twelve 250 ml. extracts plus the dichloroethane, was treated with activated charcoal and the chloroform was removed by vacuum distillation yielding 88 g. of white epsilon-caprolactam, M.P. 70°–71.5° C. The second and third batches, each composed of six 250 ml. extracts, yielded 4.7 g. and 2.2 g. respectively, bringing the total yield to 94.9%.

A portion of the epsilon-caprolactam from the first batch was polymerized without further purification. The resultant polycaprolactam was a superior grade of polymer having a M.P. of 223°–225° C.

Various changes and modifications of this invention can be made and, to the extent that such variations incorporate the spirit of this invention, they are intended to be included within the scope of the appended claims.

What is claimed is:

1. The process of separating caprolactam from a liquid reaction mixture formed by the rearrangement of cyclohexanone oxime by polyphosphoric acid which comprises extracting the reaction mixture with an organic solvent having a boiling point of 100 to 175° C. without prior neutralization of the reaction mixture, and isolating the epsilon-caprolactam of the organic solvent extract.

2. The process of claim 1 in which the solvent has a boiling point above 125° C.

3. The process of claim 2 in which the solvent is xylene.

4. The process of claim 2 in which the solvent is *n*-decane.

5. The process of claim 2 in which the solvent is tetrachloroethane.

6. The process of separating caprolactam from a liquid reaction mixture formed by the rearrangement of cyclohexanone oxime by polyphosphoric acid which comprises diluting the reaction mixture with water and, without neutralization thereof, extracting the diluted mixture with a water immiscible organic solvent having a boiling point of about 80° C. to 175° C., separating the organic solvent phase from the aqueous phase, and isolating the epsilon-caprolactam from the organic solvent extract.

7. The process of claim 6 in which dilution is effected to a maximum polyphosphoric acid content of 65% as $P_2O_5$.

8. The process of claim 6 in which at least a 50% dilution of the orthophosphoric acid content is effected.

9. The process of separating caprolactam from a liquid reaction mixture formed by the rearrangement of cyclohexanone oxime by polyphosphoric acid in a water immiscible inert organic liquid having a boiling point of about 80° C. to 175° C. and in which the oxime is soluble which comprises diluting the reaction mixture with water without neutralization of the mixture, separating the organic liquid phase containing the epsilon-caprolactam, further extracting the diluted aqueous acid mixture with the organic liquid to recover additional amounts of epsilon-caprolactam, isolating the epsilon-caprolactam from the organic liquid extracts, concentrating the diluted aqueous acid mixture to reform polyphosphoric acid, and recycling it for heating with oxime.

References Cited in the file of this patent

UNITED STATES PATENTS

| | | |
|---|---|---|
| 2,249,177 | Schlack | July 15, 1941 |

FOREIGN PATENTS

| | | |
|---|---|---|
| 59,942 | Netherlands | Sept. 17, 1947 |
| 920,072 | Germany | Nov. 11, 1954 |

OTHER REFERENCES

Fieser: "Organic Chemistry," 3rd Ed (1956), page 702.

Noller: "Chemistry of Organic Compounds," 2nd Ed. (1958), page 544.

Gould: "Mechanism and Structure in Organic Chemistry," pages 618–21 (1959), Holt-Dryden.